United States Patent
Jung et al.

(10) Patent No.: US 9,420,488 B2
(45) Date of Patent: *Aug. 16, 2016

(54) APPARATUS AND METHOD OF REPORTING MEASUREMENT RESULT IN WIRELESS COMMUNICATION SYSTEM

(71) Applicant: LG ELECTRONICS INC., Seoul (KR)

(72) Inventors: Sung Hoon Jung, Anyang-si (KR); Sung Duck Chun, Anyang-si (KR); Seung June Yi, Anyang-si (KR); Young Dae Lee, Anyang-si (KR); Sung Jun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 35 days.

This patent is subject to a terminal disclaimer.

(21) Appl. No.: 14/482,723

(22) Filed: Sep. 10, 2014

(65) Prior Publication Data

US 2014/0378068 A1 Dec. 25, 2014

Related U.S. Application Data

(63) Continuation of application No. 13/019,223, filed on Feb. 1, 2011, now Pat. No. 8,902,768.

(60) Provisional application No. 61/301,179, filed on Feb. 3, 2010, provisional application No. 61/302,040, filed on Feb. 5, 2010, provisional application No. 61/304,770, filed on Feb. 15, 2010.

(51) Int. Cl.
*H04W 24/10* (2009.01)

(52) U.S. Cl.
CPC ............................... *H04W 24/10* (2013.01)

(58) Field of Classification Search
None
See application file for complete search history.

(56) References Cited

U.S. PATENT DOCUMENTS

| | | | |
|---|---|---|---|
| 2004/0032845 A1* | 2/2004 | Chen | H04W 36/36 370/338 |
| 2005/0042987 A1 | 2/2005 | Lee et al. | |
| 2008/0130584 A1 | 6/2008 | Pani et al. | |
| 2008/0214198 A1 | 9/2008 | Chen et al. | |
| 2009/0005029 A1 | 1/2009 | Wang et al. | |
| 2009/0036116 A1 | 2/2009 | Kim et al. | |

(Continued)

FOREIGN PATENT DOCUMENTS

| | | |
|---|---|---|
| CN | 101610536 | 12/2009 |
| KR | 10-2009-0016431 | 2/2009 |
| WO | 2009/022835 | 2/2009 |

OTHER PUBLICATIONS

ZTE, "Measurement modeling in CA," 3GPP TSG-RAN WG2 Meeting #68, R2-096766, Nov. 2009, 5 pages.

(Continued)

*Primary Examiner* — Sulaiman Nooristany
(74) *Attorney, Agent, or Firm* — Lee, Hong, Degerman, Kang & Walmey; Jonathan Kang; Michael Monaco

(57) ABSTRACT

A method and apparatus of reporting measurement results in a wireless communication system is provided. A user equipment receives a measurement configuration which configures a plurality of serving cells as measurement objects and performs measurements for the plurality of serving cells based on the measurement configuration to determine measurement results for the plurality of serving cells. The user equipment reports the measurement results for the plurality of serving cells.

11 Claims, 14 Drawing Sheets

(56) References Cited

U.S. PATENT DOCUMENTS

| | | | |
|---|---|---|---|
| 2009/0247150 A1* | 10/2009 | Fischer | H04W 24/10 455/425 |
| 2010/0322079 A1* | 12/2010 | Kitazoe | H04W 36/0088 370/241 |
| 2011/0076999 A1* | 3/2011 | Kazmi | H04W 24/10 455/423 |
| 2011/0081868 A1 | 4/2011 | Kim et al. | |
| 2011/0092214 A1 | 4/2011 | Iwamura | |
| 2013/0148534 A1 | 6/2013 | Jung et al. | |

OTHER PUBLICATIONS

LG Electronics Inc., "Issues in measurement for CA," 3GPP TSG-RAN2 Meeting #68bis, R2-100445, Jan. 2010, 6 pages.

The State Intellectual Property Office of the People's Republic of China Application Serial No. 201180008257.6, Office Action dated Jun. 5, 2014, 8 pages.

* cited by examiner

APPARATUS AND METHOD OF REPORTING MEASUREMENT RESULT IN WIRELESS COMMUNICATION SYSTEM

CROSS-REFERENCE TO RELATED APPLICATIONS

This application is a continuation of U.S. patent application Ser. No. 13/019,223, filed on Feb. 1, 2011, now U.S. Pat. No. 8,902,768, which claims the benefit of U.S. Provisional Patent Application Nos. 61/301,179 filed on Feb. 3, 2010, 61/302,040, filed on Feb. 5, 2010, and 61/304,770, filed on Feb. 15, 2010, the contents of which are all hereby incorporated by reference herein in their entirety.

BACKGROUND OF THE INVENTION

1. Field of the Invention

The present invention relates to wireless communications, and more particularly, to a method and apparatus for reporting measurement results in a wireless communication system.

2. Related Art $3^{rd}$ generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The 3GPP LTE-A employs various techniques such as carrier aggregation, relay, etc. The 3GPP LTE system is a single carrier system supporting only one bandwidth (i.e., one component carrier) among {1.4, 3, 5, 10, 15, 20} MHz. On the other hand, the LTE-A employs multiple carriers using carrier aggregation. The carrier is defined with a center frequency and a bandwidth. A multiple-carrier system uses a plurality of component carriers having a narrower bandwidth than a full bandwidth.

A user equipment (UE) persistently performs measurement to maintain quality of a radio link with a serving cell from which the UE receives a service. A cell or frequency to be measured is referred to as a measurement object, and is associated with a reporting configuration for independently triggering reporting of a measurement result for each measurement object. The UE performs measurement on the measurement objects, and when the reporting configuration is satisfied, reports the measurement result to a base station (BS).

According to the conventional measurement procedure, measurement is configured to the UE for each frequency. However, in the multiple-carrier system, a plurality of cells may be configured to the UE. When the plurality of cells use different frequencies, a plurality of measurement configurations are given to the UE, and then a measurement reporting time are differently configured for each measurement configuration. Since the network cannot concurrently receive measurement results for frequencies, the network cannot configure the plurality of cells to the UE.

In the multiple-carrier system, the number of cells configured to the UE is not fixed. Instead, the number of cells configured dynamically may vary. If the measurement configuration is modified whenever a new cell is added or a cell in use is deleted, signaling overhead may increase.

SUMMARY OF THE INVENTION

The present invention provides a method and apparatus for reporting measurement results in a wireless communication system.

In an aspect, a method of reporting measurement results in a wireless communication system is provided. The method includes receiving, by a user equipment from a base station, a measurement configuration which configures a plurality of serving cells as measurement objects, performing, by the user equipment, measurements for the plurality of serving cells based on the measurement configuration to determine measurement results for the plurality of serving cells, and reporting, by the user equipment to the base station, the measurement results for the plurality of serving cells.

The method may further include performing, by the user equipment, measurements for neighboring cells on at least one serving frequency to determine each best neighboring cell on each serving frequency, the at least one serving frequency being used by at least one serving cell selected among the plurality of serving cells, and reporting, by the user equipment to the base station, measurement results for each best neighboring cell on each serving frequency.

The measurement configuration may include an indicator indicating whether measurement results for each best neighboring cell are reported.

The measurement configuration may include a measurement criterion that is associated with at least one measurement object and is used to trigger the measurement reporting.

The at least one serving frequency may be other than the frequency corresponding with a measurement object that triggers the measurement reporting.

The indicator may be associated with the measurement object that triggers the measurement reporting.

In another aspect, an apparatus for reporting measurement results in a wireless communication system is provided. The method includes a radio frequency unit for transmitting and receiving radio signals, and a processor operatively coupled with the radio frequency unit and configured for receiving, from a base station, a measurement configuration which configures a plurality of serving cells as measurement objects, performing, measurements for the plurality of serving cells based on the measurement configuration to determine measurement results for the plurality of serving cells, and reporting, to the base station, the measurement results for the plurality of serving cells.

DESCRIPTION OF EXEMPLARY EMBODIMENTS

Figure 1:
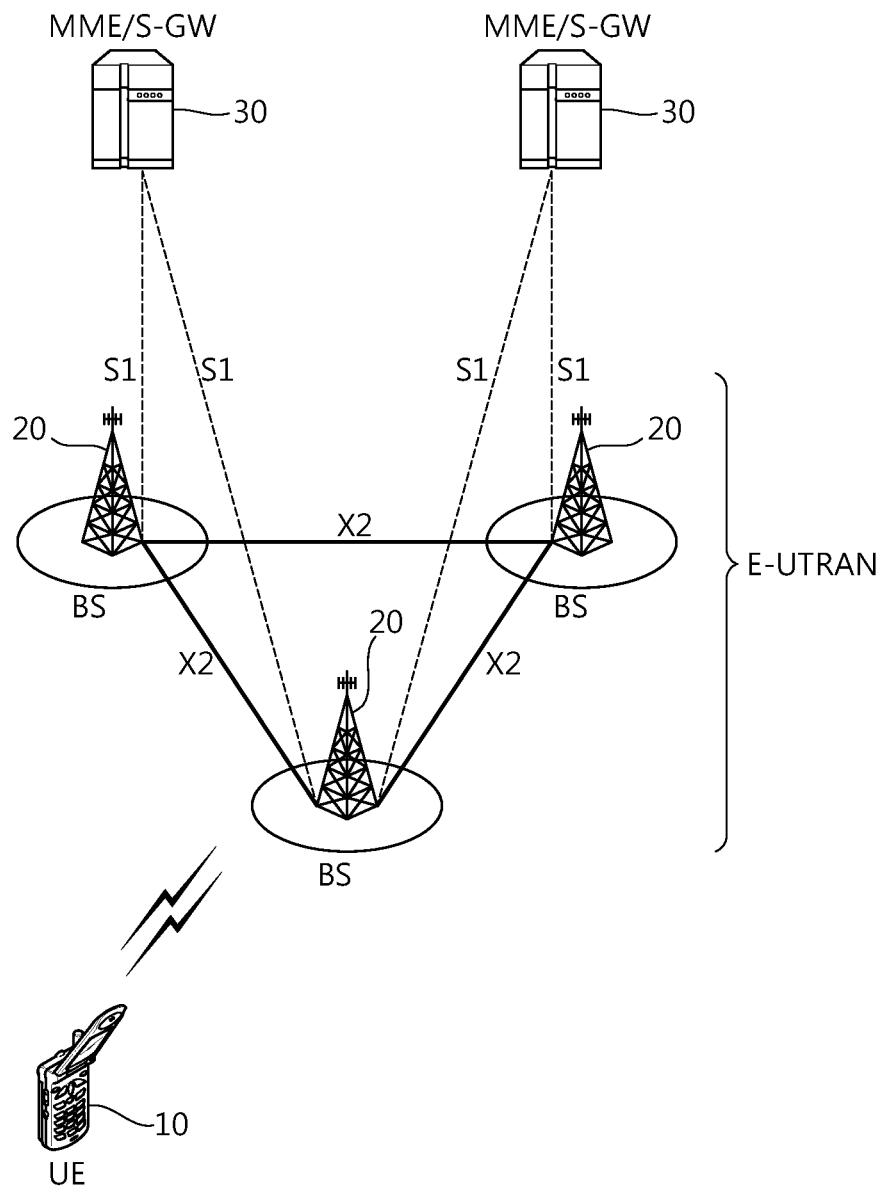
FIG. 1 shows a wireless communication system to which the present invention is applied.

FIG. 1 illustrates a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
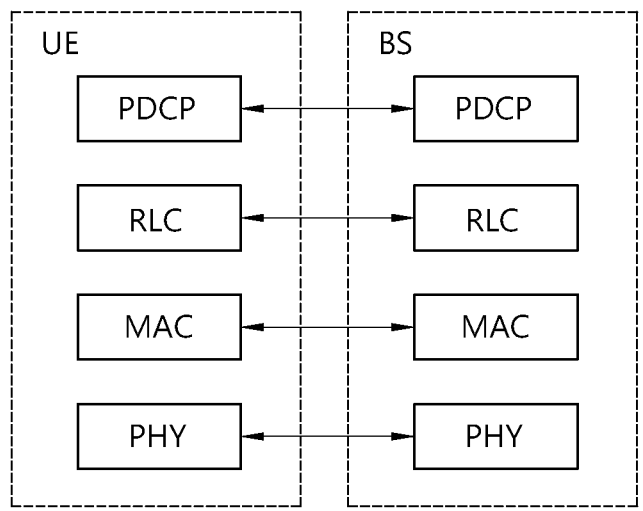
FIG. 2 is a diagram illustrating a radio protocol architecture for a user plane.
Figure 3:
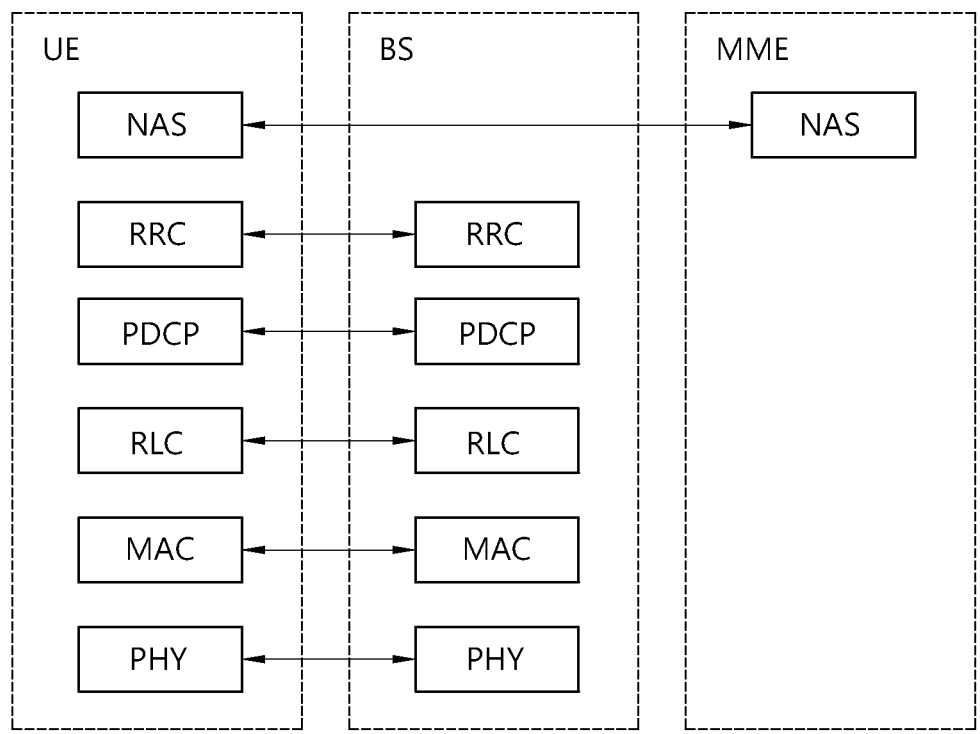
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/demultiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network. The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC connected state, and otherwise the UE is in an RRC idle state.

Data are transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several sub-carriers in a frequency domain. One sub-frame includes a plurality of symbols in the time domain. One subframe includes a plurality of resource blocks. One resource block includes a plurality of symbols and a plurality of sub-carriers. Further, each subframe may use specific sub-carriers of specific symbols (e.g., a first symbol) of a corresponding subframe for a physical downlink control channel (PDCCH), i.e., an L1/L2 control channel. A transmission time interval (TTI) is a unit time of data transmission, and is 1 millisecond (ms) which corresponds to one subframe.

Hereinafter, an RRC state of a UE and an RRC connection will be disclosed.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a procedure of registering to the network through an initial attach procedure. If the attach procedure is successfully completed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Next, system information will be disclosed.

The system information includes essential information that needs to be known to a UE to access a BS. Thus, the UE has to receive all system information before accessing the BS. Further, the UE always has to have the latest system information. Since the system information is information that must be known to all UEs in one cell, the BS periodically transmits the system information.

According to the section 5.2.2 of 3GPP TS 36.331 V8.7.0 (2009-09) "Radio Resource Control (RRC); Protocol specification (Release 8)", the system information is classified into a master information block (MIB), a scheduled block (SB), and a system information block (SIB). The MIB allows the UE to know a physical configuration (e.g., bandwidth) of a specific cell. The SB reports transmission information (e.g., a transmission period or the like) of SIBs. The SIB is a group of a plurality of pieces of system information related to each other. For example, an SIB includes only information of a neighboring cell, and another SIB includes only information of an uplink radio channel used by the UE.

In general, a service provided by the network to the UE can be classified into three types to be described below. Further, according to which service can be provided, the UE recognizes a cell type differently. A service type will be first described below, and then the cell type will be described.

1) Limited service: This service provides an emergency call and an earthquake and tsunami warning system (ETWS), and can be provided in an acceptable cell.

2) Normal service: This service denotes a public use service for general use, and can be provided in a suitable or normal cell.

3) Operator service: This service denotes a service for a network service provider, and a cell can be used only by the network service provider and cannot be used by a normal user.

A service type provided by a cell can be identified as follows.

1) Acceptable cell: A UE can receive a limited service in this cell. This cell is not barred from the perspective of the UE, and satisfies a cell selection criterion of the UE.

2) Suitable cell: The UE can receive a regular service in this cell. This cell satisfies a condition of an acceptable cell, and also satisfies additional conditions. Regarding the additional conditions, this cell has to belong to a PLMN to which the UE can access, and a tracking area update procedure of the UE must not be barred in this cell. If a specific cell is a CSG cell, this cell must be accessible by the UE as a CSG member.

3) Barred cell: Information indicating that a cell is a barred cell is broadcast in this cell by using system information.

4) Reserved cell: Information indicating that a cell is a reserved cell is broadcast in this cell by using system information.

Now, a radio link failure will be described.

A UE persistently performs measurement to maintain quality of a radio link with a serving cell from which the UE receives a service. The UE determines whether communication is impossible in a current situation due to deterioration of the quality of the radio link with the serving cell. If it is determined that the quality of the serving cell is so poor that communication is almost impossible, the UE determines the current situation as a radio link failure.

If the radio link failure is determined, the UE gives up maintaining communication with the current serving cell, selects a new cell through a cell selection (or cell reselection) procedure, and attempts RRC connection re-establishment to the new cell.

Figure 4:
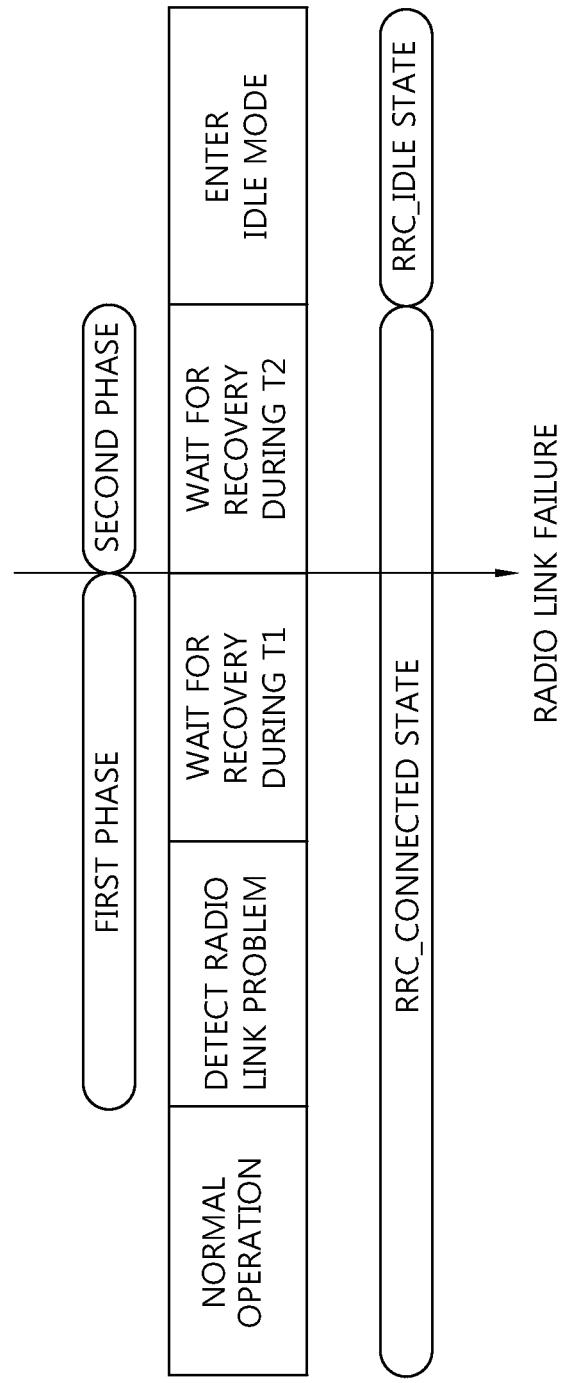
FIG. 4 is a diagram illustrating an operation of a UE selecting a cell in an idle mode.

FIG. 4 shows an example of a radio link failure. An operation related to the radio link failure can be described in two phases.

In a first phase, while performing a normal operation, a UE determines whether a current communication link has a problem. Upon detecting the problem, the UE declares a radio link problem, and waits for a recovery of the radio link during a first wait time T1. If the radio link is recovered before the expiry of the first wait time T1, the UE re-performs the normal operation. If the radio link is not recovered until the first wait time expires, the UE declares the radio link failure, and enters a second phase.

In the second phase, the UE waits again for the recovery of the radio link during a second wait time T2. If the radio link is not recovered until the second wait time expires, the UE enters an RRC idle state. Alternatively, the UE may perform an RRC re-establishment procedure.

The RRC connection re-establishment procedure is a procedure for re-establishing an RRC connection in an RRC connected state. Since the UE does not enter the RRC idle state, the UE does not initiate all connection configurations (e.g., radio bearer configuration, or the like). Instead, when the RRC connection re-establishment procedure starts, the UE temporarily suspends the use of other radio bearers except for an SRB. If the RRC connection re-establishment is successful, the UE resumes the use of radio bearers of which the use is temporarily suspended.

Figure 5:
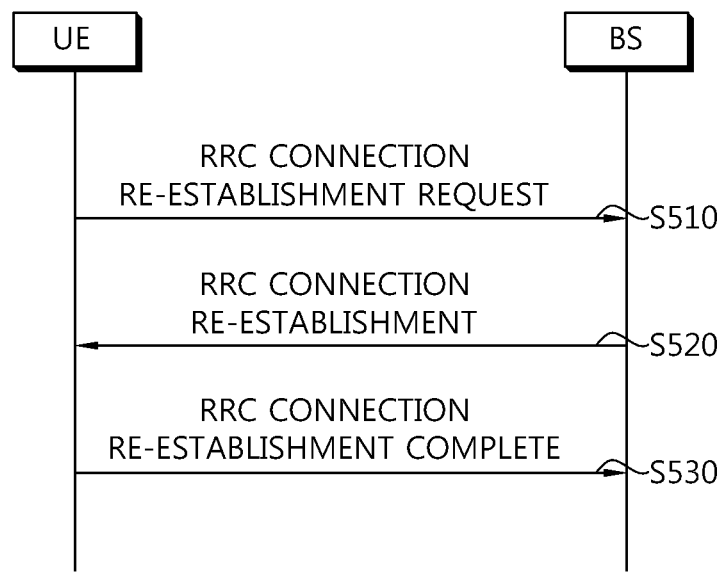
FIG. 5 is a flowchart showing a success of a connection re-establishment procedure.

FIG. 5 is a flowchart showing a success of a connection re-establishment procedure.

A UE performs cell selection to select a cell. The UE receives system information to receive basis parameters for cell access in the selected cell. Then, the UE sends an RRC connection re-establishment request message to a BS (step S510).

If the selected cell is a cell having the context of the UE, i.e., a prepared cell, the BS accepts the RRC connection re-establishment request of the UE, and transmits an RRC connection re-establishment message to the UE (step S520). The UE transmits an RRC connection re-establishment complete message to the BS, and thus the RRC connection re-establishment procedure can be successful (step S530).

Figure 6:
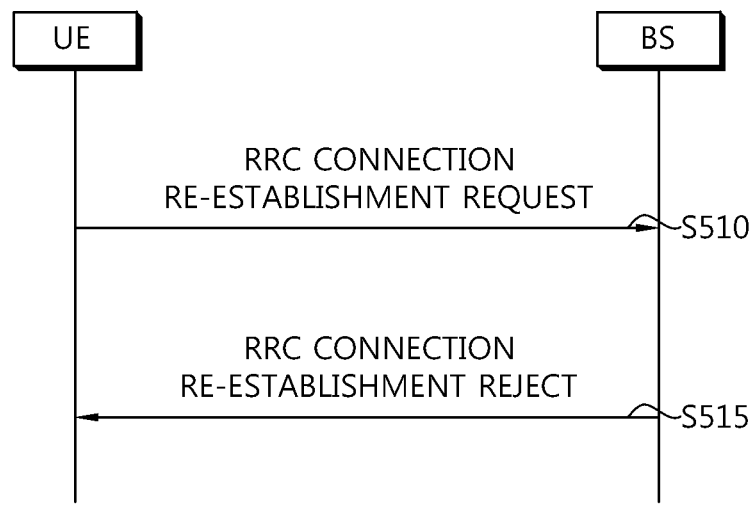
FIG. 6 is a flowchart showing a failure of a connection re-establishment procedure.

FIG. 6 is a flowchart showing a failure of a connection re-establishment procedure. A UE transmits an RRC connection re-establishment request message to a BS (step S510). If a selected cell is not a prepared cell, a BS transmits an RRC connection re-establishment reject message to the UE in response to an RRC connection re-establishment request (step S515).

The following description is related to measurement.

It is necessary for a mobile communication system to support mobility of a UE. Therefore, the UE persistently measures quality of a serving cell providing a current service and quality of a neighboring cell. The UE reports a measurement result to a network at a proper time. The network provides optimal mobility to the UE by using a handover or the like.

To provide information which can be helpful for a network operation of a service provider in addition to the purpose of supporting the mobility, the UE may perform measurement with a specific purpose determined by the network, and may report the measurement result to the network. For example, the UE receives broadcast information of a specific cell determined by the network. The UE may report to a serving cell a cell identify (also referred to as a global cell identity) of the specific cell, location identification information indicating a location of the specific cell (e.g., a tracking area code), and/or other cell information (e.g., whether it is a member of a closed subscriber group (CSG) cell).

In a state of moving, if the UE determines that quality of a specific region is significantly bad, the UE may report a measurement result and location information on cells with bad quality to the network. The network may attempt to optimize the network on the basis of the measurement result reported from UEs which assist the network operation.

In a mobile communication system having a frequency reuse factor of 1, mobility is generally supported between different cells existing in the same frequency band. Therefore, in order to properly guarantee the UE mobility, the UE has to properly measure cell information and quality of neighboring cells having the same center frequency as a center frequency of a serving cell. Measurement on a cell having the same center frequency as the center frequency of the serving cell is referred to as intra-frequency measurement. The UE performs the intra-frequency measurement and reports a measurement result to the network, so as to achieve the purpose of the measurement result.

A mobile communication service provider may perform a network operation by using a plurality of frequency bands. If a service of a communication system is provided by using the plurality of frequency bands, optimal mobility can be guaranteed to the UE when the UE is able to properly measure cell information and quality of neighboring cells having a different center frequency from the center frequency of the serving cell. Measurement on a cell having the different center frequency from the center frequency of the serving cell is referred to as inter-frequency measurement. The UE has to be able to perform the inter-frequency measurement and report a measurement result to the network.

When the UE supports measurement on a heterogeneous network, measurement on a cell of the heterogeneous network may be performed according to a configuration of a BS. Such a measurement on the heterogeneous network is referred to as inter-radio access technology (RAT) measurement. For example, RAT may include a GMS EDGE radio access network (GERAN) and a UMTS terrestrial radio access network (UTRAN) conforming to the 3GPP standard, and may also include a CDMA 200 system conforming to the 3GPP2 standard.

Figure 7:
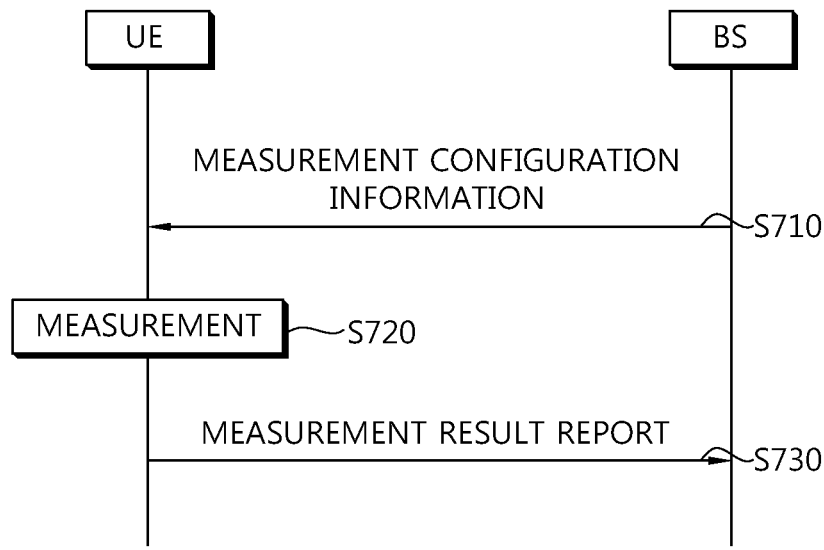
FIG. 7 is a flowchart showing a conventional method of performing measurement.

FIG. 7 is a flowchart showing a conventional method of performing measurement.

A UE receives measurement configuration information from a BS (step S710). A message including the measurement configuration information is referred to as a measurement configuration message. The UE performs measurement based on the measurement configuration information (step S720). If a measurement result satisfies a reporting condition included in the measurement configuration information, the UE reports the measurement result to the BS (step S730). A message including the measurement result is referred to as a measurement report message.

The measurement configuration information may include the following information.

(1) Measurement object: The object is on which the UE performs the measurements. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighboring cell having the same frequency as a frequency of a serving cell, the inter-frequency measurement object may indicate a neighboring cell having a different frequency from a frequency of the serving cell, and the inter-RAT measurement object may indicate a neighboring cell of a different RAT from an RAT of the serving cell.

(2) Reporting configuration: This includes a reporting criterion and a reporting format. The reporting criterion is used to trigger the UE to send a measurement report and can either be periodical or a single event description. The reporting format is a quantity that the UE includes in the measurement report and associated information (e.g. number of cells to report).

(3) Measurement identify: Each measurement identity links one measurement object with one reporting configuration. By configuring multiple measurement identities, it is possible to link more than one measurement object to the same reporting configuration, as well as to link more than one reporting configuration to the same measurement object. The measurement identity is used as a reference number in the measurement report. The measurement identify may be included in the measurement report to indicate a specific measurement object for which the measurement result is obtained and a specific reporting condition according to which the measurement report is triggered.

(4) Quantity configuration: One quantity configuration is configured per RAT type. The quantity configuration defines the measurement quantities and associated filtering used for all event evaluation and related reporting of that measurement type. One filter can be configured per measurement quantity.

(5) Measurement gaps: Measurement gaps are periods that the UE may use to perform measurements when downlink transmission and uplink transmission are not scheduled.

To perform a measurement procedure, the UE has a measurement object, a reporting configuration, and a measurement identity.

In 3GPP LTE, the BS can assign only one measurement object to the UE with respect to one frequency. Events for triggering measurement reporting shown in the table below are defined in the section 5.5.4 of 3GPP TS 36.331 V8.5.0 (2009-03) "Evolved Universal Terrestrial Radio Access (E-UTRA) Radio Resource Control (RRC); Protocol specification (Release 8)".

TABLE 1

| Event | Reporting Condition |
| --- | --- |
| Event A1 | Serving becomes better than threshold |
| Event A2 | Serving becomes worse than threshold |
| Event A3 | Neighbor becomes offset better than serving |
| Event A4 | Neighbor becomes better than threshold |
| Event A5 | Serving becomes worse than threshold1 and neighbor becomes better than threshold2 |
| Event B1 | Inter RAT neighbor becomes better than threshold |
| Event B2 | Serving becomes worse than threshold1 and inter RAT neighbor becomes better than threshold2 |

If the measurement result of the UE satisfies the determined event, the UE transmits a measurement report message to the BS.

Figure 8:
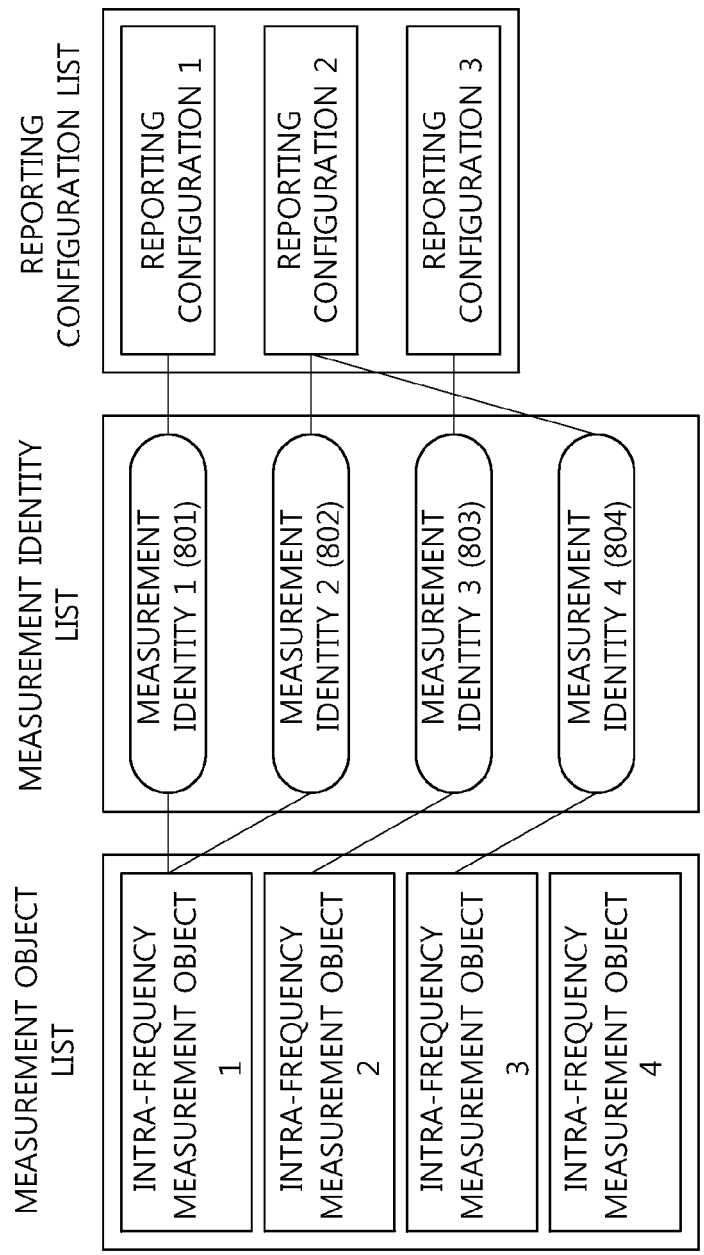
FIG. 8 shows an example of a measurement configuration assigned to a UE.

FIG. 8 shows an example of a measurement configuration assigned to a UE.

First, a measurement identity1 801 associates an intra-frequency measurement object with a reporting configuration 1. The UE performs intra-frequency measurement. The reporting configuration 1 is used to determine a reporting type and a criterion for reporting a measurement result.

A measurement identity2 802 is associated with the intra-frequency measurement object similarly to the measurement identifier1 801, and associates the intra-frequency measurement object with a reporting configuration 2. The UE performs intra-frequency measurement. The reporting configuration 2 is used to determine a reporting format and a criterion for reporting a measurement result.

By using the measurement identity1 801 and the measurement identity2 802, the UE transmits a measurement result even if the measurement result on the intra-frequency measurement object satisfies any one of the reporting configuration 1 and the reporting configuration 2.

A measurement identity3 803 associates an inter-frequency measurement object 1 with a reporting configuration 3. When a measurement result on the inter-frequency measurement object 1 satisfies a reporting criterion included in the reporting configuration 1, the UE reports the measurement result.

A measurement identity4 804 associates an inter-frequency measurement object 2 with the reporting configuration 2. When a measurement result on the inter-frequency measurement object 2 satisfies a reporting criterion included in the reporting configuration 2, the UE reports the measurement result.

Meanwhile, the measurement object, the reporting configuration, and/or the measurement identity can be added, modified, and/or deleted. To instruct such operations, the BS may transmit to the UE a new measurement configuration message or a measurement configuration modification message.

Figure 9:
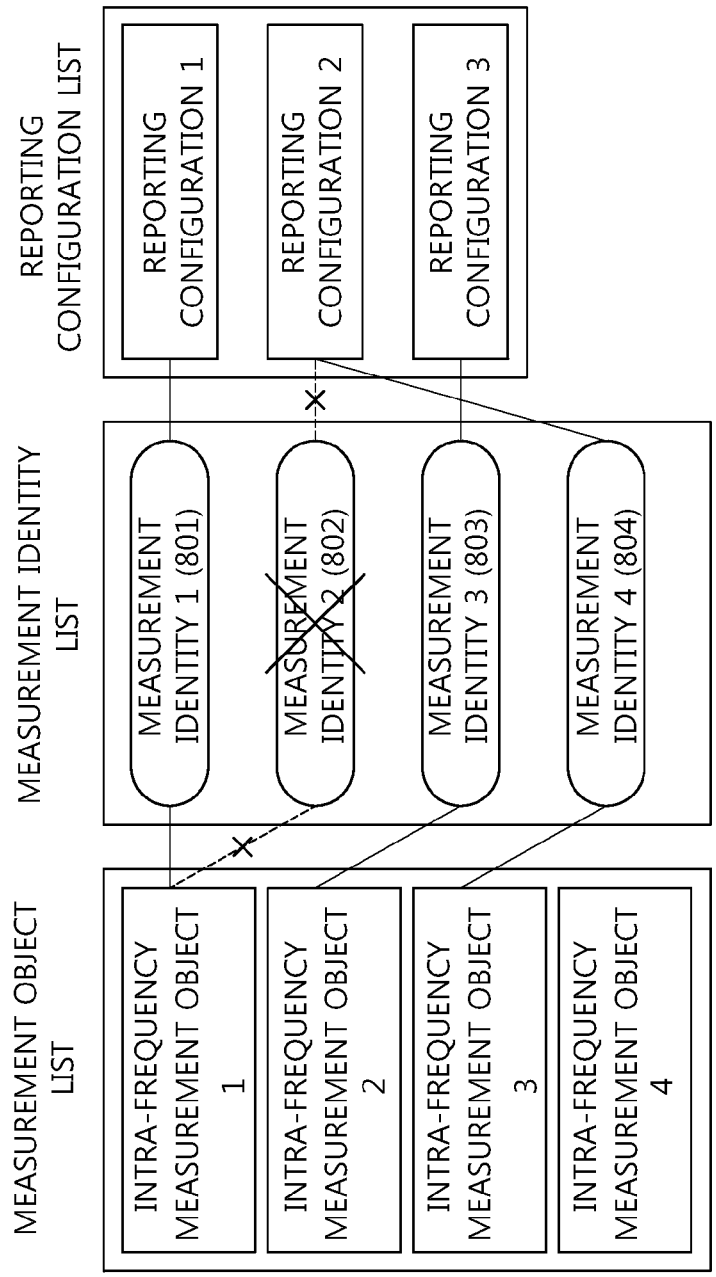
FIG. 9 shows an example of deleting a measurement identity.

FIG. 9 shows an example of deleting a measurement identity. When a measurement identity2 802 is deleted, measurement on a measurement object associated with the measurement identity2 802 is suspended, and a measurement report is not transmitted. A reporting configuration or a measurement object associated with the deleted measurement identity may not be modified.

Figure 10:
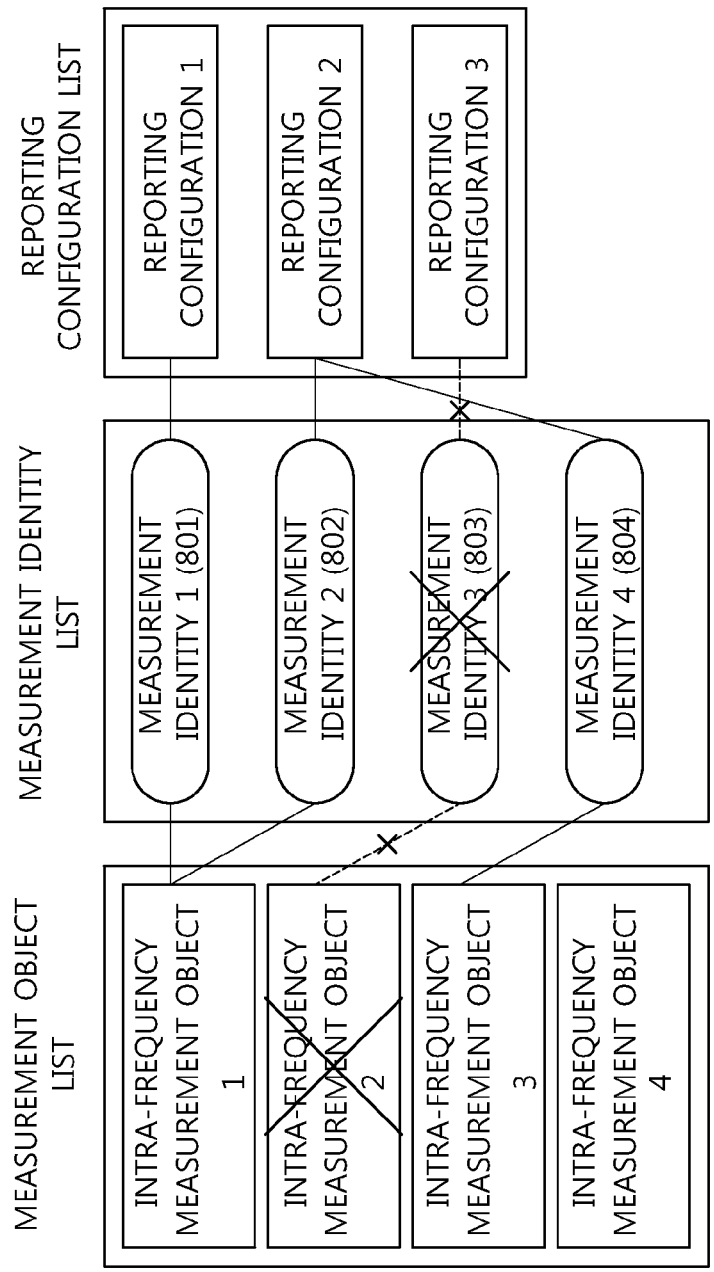
FIG. 10 shows an example of deleting a measurement object.

FIG. 10 shows an example of deleting a measurement object. When an inter-frequency measurement object 1 is deleted, a UE also deletes an associated measurement identifier3 803. Measurement on the inter-frequency measurement object 1 is suspended, and a measurement report is not transmitted. However, a reporting configuration associated with the deleted inter-frequency measurement object 1 may not be modified or deleted.

When the reporting configuration is deleted, the UE also deletes an associated measurement identifier. The UE suspends measurement on an associated measurement object according to the associated measurement identifier. Measurement on the measurement object and measurement reporting are suspended. However, a measurement object associated with the deleted reporting configuration may not be modified or deleted.

Figure 11:
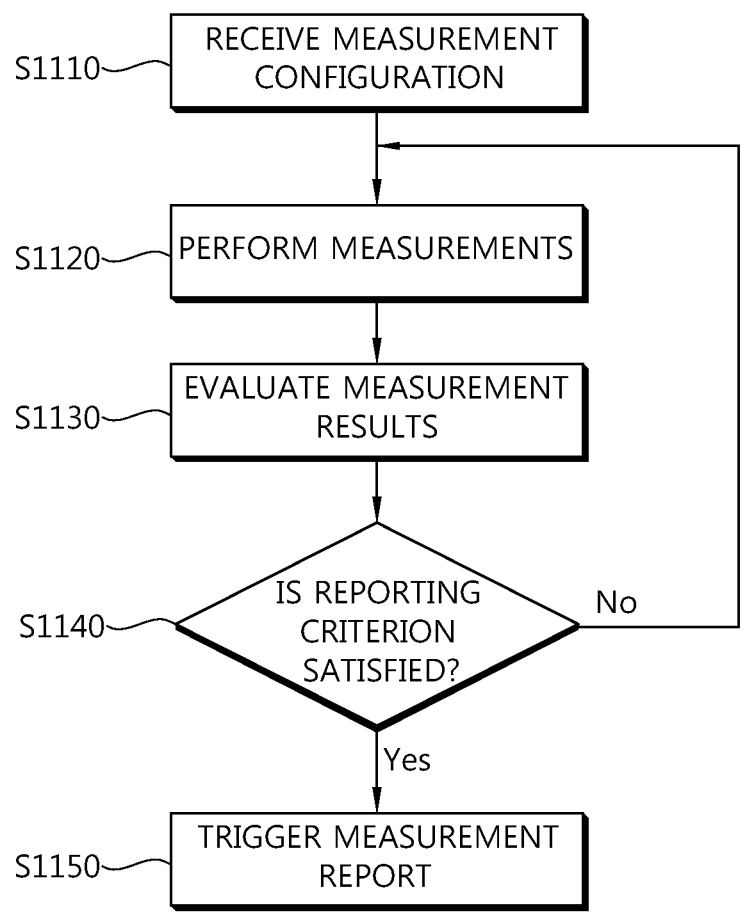
FIG. 11 shows a conventional measurement procedure.

FIG. 11 shows a conventional measurement procedure.

A UE receives a measurement configuration from a BS (S1110). The UE performs measurements for a measurement object identified by a measurement identity (S1120). The UE evaluates measurement results to determine whether a reporting criterion is satisfied (S1130). If the reporting criterion is satisfied (S1140), measurement report is triggered.

The measurement report may include a measurement identity, a measured quantity of a serving cell and a measurement result of a neighboring cell. The measurement identity identifies a measurement object on which the measurement report is triggered. The measurement result of the neighboring cell may include a cell identity of the neighboring cell and a measured quantity of the neighboring cell. The measured quantity may include at least one of RSRP and RSRQ.

Now, a multiple carrier system will be described.

A 3GPP LTE system supports a case where a downlink bandwidth and an uplink bandwidth are set differently under the premise that one component carrier (CC) is used. The CC is defined with a center frequency and a bandwidth. This implies that the 3GPP LTE is supported only when the downlink bandwidth and the uplink bandwidth are identical or different in a situation where one CC is defined for each of a downlink and an uplink. For example, the 3GPP LTE system supports up to 20 MHz and the uplink bandwidth and the downlink bandwidth may be different from each other, but supports only one CC in the uplink and the downlink.

A CC may correspond to a cell. A carrier frequency is a center frequency of the CC or a center frequency of the cell. When a UE supports a plurality of CCs, the UE can receive or transmit data through a plurality of CCs corresponding to multiple serving cells.

Spectrum aggregation (or bandwidth aggregation, also referred to as carrier aggregation) supports a plurality of CCs. The spectrum aggregation is introduced to support an increasing throughput, to prevent a cost increase caused by using a broadband radio frequency (RF) element, and to ensure compatibility with legacy systems.

Figure 12:
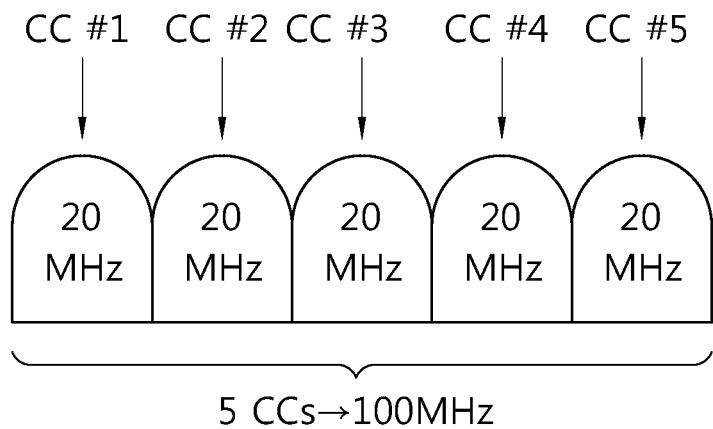
FIG. 12 shows an example of multiple carriers.

FIG. 12 shows an example of multiple carriers. There are five CCs, i.e., CC #1, CC #2, CC #3, CC #4, and CC #5, each of which has a bandwidth of 20 MHz. Therefore, if the five CCs are allocated in a granularity of a CC unit having the bandwidth of 20 MHz, a bandwidth of up to 100 MHz can be supported.

The bandwidth of the CC or the number of the CCs is exemplary purposes only. Each CC may have a different bandwidth. The number of downlink CCs and the number of uplink CCs may be identical to or different from each other.

One CC may correspond to one cell.

The term 'primary cell' denotes the cell, operating on the primary frequency, in which the UE either performs the initial connection establishment procedure or initiates the connection re-establishment procedure, or the cell indicated as the primary cell in the handover procedure.

The term 'secondary cell' denotes a cell, operating on a secondary frequency, which may be configured once an RRC connection is established and which may be used to provide additional radio resources.

The term 'serving cells' is used to denote the set of one or more cells comprising of the primary cell and all secondary cells. The serving frequency is a frequency used by each serving cell.

According to the proposed invention, the UE measures quality of a plurality of configured cells, and reports a measurement result on the plurality of cells to the BS when a reporting configuration is satisfied.

Even if a measurement configuration related to the measurement on the plurality of cells is not activated, the UE can perform measurement constantly when a corresponding cell is configured to the UE The UE can measure the plurality of cells considering parameters (i.e. bandwidth) of a measurement object associated with the frequency for the corresponding cell. If the associated measurement object is not configured, the UE can measure the cell considering a measurement bandwidth in the system information of the cell.

The plurality of cells may include a cell currently configured to the UE and a cell that can be configured afterwards (e.g., a deactivated cell). The BS can configure whether the plurality of cells are the plurality of serving cells which are currently configured to the UE or the plurality of candidate cells which can be configured later as serving cells. The measurement reporting criterion may be associated with whether the plurality of cells are the plurality of serving cells which are currently configured to the UE.

The plurality of cells may be cells over a plurality of frequencies.

Now, a reporting criterion will be proposed.

The UE may consider the following events as an embodiment of the reporting criterion related to a plurality of cells. In order to determine whether measurement reporting is triggered, the UE measures configurable cells and/or neighboring cells on a frequency of the configurable cells.

(1) Event CA-A1

As an initial reporting criterion for triggering the measurement reporting, if N (N>=1) cells having good quality are identified in descending order of quality (these cells are referred to as best-N cells), the UE reports a measurement result of the best-N cells to the BS.

After the initial reporting, the UE continues to measure the best-N cells. If current best-N cells become different from the previously reported best-N cells as a result of measurement, the UE reports a measurement result of newly detected best-N cells.

The BS may report a list of configurable cells that can be configured afterwards to the UE. The cell list may be delivered to the UE by using a measurement configuration or a different RRC message. By using the cell list, the UE can determine whether a detected neighboring cell is a cell configurable to the UE.

(2) Event CA-A2

An initial reporting criterion is identical to the initial reporting criterion of the event CA-A1.

A next reporting criterion is similar to that of the event CA-A1, except for the followings. A measurement result is evaluated, and if current best-N cells become different from the previously reported best-N cells, the UE reports a measurement result of newly detected best-N cells. Alternatively, the UE may report the measurement result of the best-N cells when the best-N cells do not change but there is a change in the order of the cells. If the order of the cells is changed, the measurement result may include information on the order of the cells.

(3) Event CA-B1

As an initial reporting criterion, if N (N>=1) serving cells having good quality are identified in descending order of quality (these cells are referred to as best-N serving cells), the UE reports a measurement result of the best-N serving cells.

After the initial reporting, the UE performs measurement on configured serving cells. If there is a change in the best-N serving cells, the UE reports the measurement result of the best-N serving cells which are newly found.

(4) Event CA-B2

An initial reporting criterion is identical to the initial reporting criterion of the event CA-B1.

A next reporting criterion subsequent to the initial reporting criterion is similar to that of the event CA-B1, except for the followings. A measurement result is evaluated, and if current best-N serving cells become different from the previously reported best-N serving cells, the UE reports a measurement result of newly detected best-N serving cells. Alternatively, the UE may report the measurement result of the best-N serving cells when the best-N serving cells do not change but there is a change in the order of the cells. If the order of the cells is changed, the measurement result may include information on the order of the cells.

(5) Event CA-C1

As an initial reporting criterion, the UE measures cells within a serving frequency, and reports a measurement result of best-N cells on each frequency. If N=1 and there are two serving cells, two serving frequencies are defined. The UE reports a measurement result of a cell having the best quality on the two serving frequencies. In this case, the serving cell may be included as a comparison object, or only neighboring cells excluding the serving cell may be included. If the serving cell is excluded, the UE reports a measurement result on the neighboring cell having the best quality on each serving frequency.

If there is a change in the best-N cells on each frequency after the initial reporting, the UE reports a measurement result of new best-N cells on each frequency.

(6) Event CA-C2

An initial reporting criterion is identical to the initial reporting criterion of the event CA-C1.

After the initial reporting, the UE continues to measure cells included in the frequency list. A measurement result is evaluated, and if current best-N cells become different from the previously reported best-N cells on each serving frequency, the UE reports a measurement result of newly detected best-N serving cells. Alternatively, the UE may report the measurement result of the best-N cells when the best-N cells do not change on each serving frequency but there is a change in the order of the cells. If the order of the cells is changed, the measurement result may include information on the order of the cells.

The events described above may independently be applied or may be combined with conventional events.

A time to be used when the UE measures cells associated with corresponding event may be limited in order to perform initial reporting for each event. The time may be received from the BS or may be predetermined. If the time for measurement of the UE is limited, the UE reports a measurement result on the basis of a result of measurement within the limited time. If the UE fails to complete measurements to configure correct measurement results within the limited time, the UE may add specific identification information for cells/frequencies on which measurements are not complete or may delete the corresponding cells from objects of measurement reporting, so that the BS can know that measurements on these cells/frequencies are not complete.

The BS may configure the UE to periodically perform subsequent reporting. The BS may configure a periodicity of the subsequent reporting. The UE performs measurement in each periodicity configured, and identifies best-N cells having good quality on the basis of the measurement. If the UE fails to identify the best-N cells within the limited periodicity, the UE may add specific identification information for cells on which measurement is not complete or may delete the corresponding cells from objects of measurement reporting, so that the BS can know that measurement on these cells is not complete.

N may be determined by the BS. Alternatively, N may be predetermined or may be implicitly determined. For example, if K measurement objects are configured to the UE, the UE may determine N derived from K.

If the BS receives the measurement result from the UE that satisfies the aforementioned reporting criterion, a cell having bad quality among cells configured to the UE may be replaced to a newly identified cell having better quality or the previously configured cell may be deleted or deactivated. Alternatively, the BS may add or activate a cell having good quality.

For the proposed measurement reporting, the event of Table 1 may be used in addition to the events (1) to (6) described above. Alternatively, combinations of the events (1) to (6) and the event of Table 1 may also be used.

If the aforementioned reporting criterion is satisfied and thus the measurement reporting is triggered, the UE may configure a measurement report as follows.

The UE may allow the measurement report to include a measurement result related to an event that triggers the measurement reporting.

In the case of the event CA-A1, measured quality and identifiers of the best-N cells may be included in the measurement report.

In the case of the event CA-A2, measured quality and identifiers of the best-N serving cells may be included in the measurement report.

In the case of the event CA-B1, measured quality and identifiers of the best-N cells may be included in the measurement report.

In the case of the event CA-B2, measured quality and identifiers of the best-N serving cells may be included in the measurement report.

In the case of the CA-C1, measured quality and identifiers of the best-N cells on each serving frequency may be included in the measurement report.

In the case of the CA-C2, measured quality and identifiers of the best-N cells on each serving frequency may be included in the measurement report.

The event proposed in the present invention may be related to a measurement object located across a plurality of frequencies or a plurality of cells.

Figure 13:
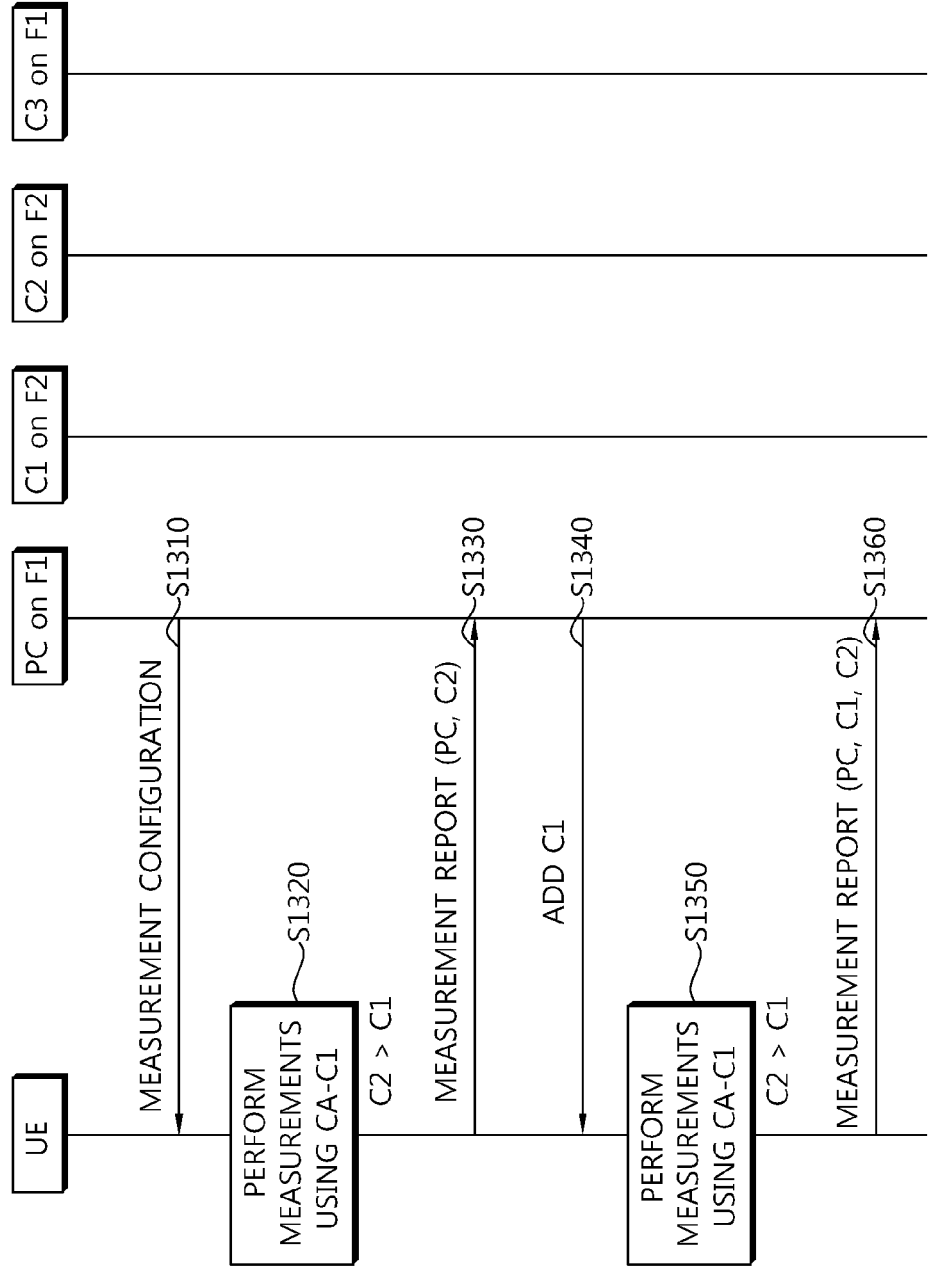
FIG. 13 is a flowchart showing a measurement result reporting method according to an embodiment of the present invention.

FIG. 13 is a flowchart showing a measurement result reporting method according to an embodiment of the present invention.

A primary cell (PC) on a frequency F1 is a serving cell. Cells C1 and C2 are located on a frequency F2. A cell C3 is located on the frequency F1. The cells C1, C2, and C3 are neighboring cells and are not activated yet.

A UE receives a measurement configuration from the PC (step S1310). In the measurement configuration, one or more serving cells may be configured as a measurement object. In addition, the measurement configuration includes a reporting configuration. It is assumed herein that the aforementioned event CA-C1 is used as a reporting criterion, and N=1. However, the event is not for restrictive purposes, and thus the event of Table 1 or any one of the events (1) to (6) described above can be used.

The UE performs measurement on the basis of the measurement configuration to obtain a measurement result of the serving cell, and determines whether the event CA-C1 is satisfied (step S1320). In this case, it is assumed that quality of the cell C2 is better than quality of the cell C1.

The UE sends to BS a measurement report including the measurement result of the PC and a measurement result of the cell C2 which is the best N-cell (step S1330).

Next, the BS adds the cell C1 as a secondary cell (step S1340). Therefore, the cell C1 also serves as the serving cell, and the frequencies F1 and F2 are serving frequencies.

The UE performs measurement on the basis of the measurement configuration to obtain the measurement result of the serving cell, and determines whether the event CA-C1 is satisfied (step S1350). It is assumed that quality of the cell C2 is better than quality of the cell C1.

The UE sends to the BS a measurement report including the measurement results of the PC and the cell C1 and the measurement result of the cell C2 (step S1360). Since the cell C1 is the serving cell, the measurement result thereof is included in the measurement report. In addition, since the cell C2 is the best-N cell on the frequency F2, the measurement result thereof is included in the measurement report.

When the event of Table 1 is used, whether the event is satisfied is determined based on one serving cell. Only best-N cells on different serving frequencies excluding a serving frequency of a serving cell corresponding to a measurement object for which the event is triggered can be considered as a reporting object. That is, quality of a neighboring cell may not be reported on the serving frequency of the serving cell corresponding to the measurement object for which the event is triggered.

Measurement results on all serving cells configured to the UE can be included in the measurement report. When the event for the measurement reporting is satisfied and thus the measurement reporting is triggered, the UE allows the measurement report to include the measurement results of the plurality of serving cells.

The measurement configuration may include an indicator indicating whether the measurement result of the best-N cells will be included in the measurement report in addition to the measurement result of all serving cells. The indicator may be associated with the measurement object that triggers the measurement reporting.

The indicator may be included in the measurement configuration associated with the events of Table 1. When the measurement configuration includes the indicator, the UE may perform measurement according to reporting criterion including the indicator instead of reporting criterions (CA-A1/2, CA-B1/2, CA-C1/2) used to report measurement results of best-N cells. The measurement report message may include measurement results on all serving cells as well as measurement results satisfying the reporting criterion. The measurement report message may further include measurement results on best-N cells.

The measurement result can be reported without causing a significant change in the conventional measurement procedure with respect to the UE to which a plurality of serving cells are configured. Since there is no need to newly define the measurement configuration even if the plurality of serving cells are frequently activated/deactivated, a radio resource required for signaling can be reduced.

Figure 14:
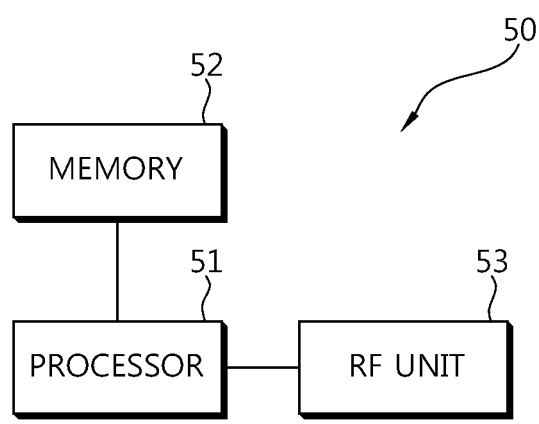
FIG. 14 is a block diagram showing a wireless apparatus to implement an embodiment of the present invention.

FIG. 14 is a block diagram showing a wireless apparatus to implement an embodiment of the present invention. An apparatus 50 may be a part of a UE.

The apparatus 50 includes a processor 51, a memory 52 and a radio frequency (RF) unit 53. The memory 52 is operatively coupled with the processor 51 and stores a variety of information to operate the processor 51. The RF unit 53 is operatively coupled with the processor 11, and transmits and/or receives a radio signal.

The processor 51 may be configured to implement proposed functions, procedures and/or methods described in this description. Layers of the radio interface protocol may be implemented in the processor 51. The processor 51 may implement operations of the UE in the embodiments in FIG. 13.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method of reporting measurement results in a wireless communication system, comprising:
   receiving, by a user equipment from a base station, a measurement configuration for a plurality of serving cells,
   wherein the measurement configuration includes an indicator indicating whether measurement results of a best neighboring cell for each serving frequency are to be reported;
   performing, by the user equipment, measurements of each serving frequency for the plurality of serving cells based on the measurement configuration to determine measurement results for each of the plurality of serving cells;
   if the indicator indicates that the measurement results of the best neighboring cell is to be reported, performing, by the user equipment, measurements for two or more neighboring cells to determine a measurement result of a best neighboring cell for each serving frequency; and
   reporting, by the user equipment to the base station, the measurement results for each of the plurality of serving cells and the measurement result of the best neighboring cell for each serving frequency.

2. The method of claim 1, wherein the measurement configuration includes a measurement criterion that is associated with at least one measurement object and is used to trigger the reporting of the measurement results.

3. The method of claim 2, wherein the at least one serving frequency is other than a frequency corresponding with a measurement object that triggers the reporting of the measurement results.

4. The method of claim 3, wherein the indicator is associated with the measurement object that triggers the reporting of the measurement results.

5. The method of claim 1, wherein the plurality of serving cells includes a primary cell and one or more secondary cells.

6. An apparatus for reporting measurement results in a wireless communication system, comprising:
   a radio frequency unit for transmitting and receiving radio signals; and
   a processor operatively coupled with the radio frequency unit and configured to:
   receive, from a base station, a measurement configuration for a plurality of serving cells,
   wherein the measurement configuration includes an indicator indicating whether measurement results of a best neighboring cell for each serving frequency are to be reported;
   perform, measurements of each serving frequency for the plurality of serving cells based on the measurement configuration to determine measurement results for each of the plurality of serving cells;

if the indicator indicates that the measurement results of the best neighboring cell is to be reported, perform measurements for two or more neighboring cells to determine a measurement result of a best neighboring cell for each serving frequency; and report, to the base station, the measurement results for each of the plurality of serving cells and the measurement result of the best neighboring cell for each serving frequency.

7. The apparatus of claim 6, wherein the measurement configuration includes an indicator indicating whether measurement results for each best neighboring cell are to be reported.

8. The apparatus of claim 7, wherein the measurement configuration includes a measurement criterion that is associated with at least one measurement object and is used to trigger the processor to report the measurement results.

9. The apparatus of claim 8, wherein the at least one serving frequency is other than the frequency corresponding with a measurement object that triggers the processor to report the measurement results.

10. The apparatus of claim 9, wherein the indicator is associated with the measurement object that triggers the processor to report the measurement results.

11. The apparatus of claim 6, wherein the plurality of serving cells includes a primary cell and one or more secondary cells.

* * * * *